US009025446B2

United States Patent
Huang (10) Patent No.: US 9,025,446 B2
(45) Date of Patent: May 5, 2015

(54) CARRIER SELECTION POLICY FOR JOINT SCHEDULING FOR CARRIER AGGREGATION IN AN LTE-ADVANCED SYSTEM

(71) Applicant: Empire Technology Development LLC, Wilmington, DE (US)

(72) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/004,371

(22) PCT Filed: Oct. 10, 2012

(86) PCT No.: PCT/CN2012/082682
§ 371 (c)(1),
(2) Date: Sep. 10, 2013

(87) PCT Pub. No.: WO2014/056152
PCT Pub. Date: Apr. 17, 2014

(65) Prior Publication Data
US 2014/0098661 A1    Apr. 10, 2014

(51) Int. Cl.
*H04L 12/26*    (2006.01)
*H04W 4/00*    (2009.01)
*H04W 28/02*    (2009.01)

(52) U.S. Cl.
CPC ................................. *H04W 28/0278* (2013.01)

(58) Field of Classification Search
None
See application file for complete search history.

(56) References Cited

U.S. PATENT DOCUMENTS

| | | | |
|---|---|---|---|
| 2006/0274712 A1* | 12/2006 | Malladi et al. | 370/345 |
| 2010/0150082 A1* | 6/2010 | Shin et al. | 370/329 |
| 2011/0242972 A1* | 10/2011 | Sebire et al. | 370/229 |
| 2012/0014269 A1* | 1/2012 | Ray et al. | 370/252 |
| 2012/0198077 A1* | 8/2012 | Wei | 709/226 |
| 2012/0236712 A1* | 9/2012 | Park et al. | 370/230 |
| 2013/0148588 A1* | 6/2013 | Comeau et al. | 370/329 |
| 2013/0176988 A1* | 7/2013 | Wang et al. | 370/331 |
| 2013/0242777 A1* | 9/2013 | Choi et al. | 370/252 |
| 2014/0079016 A1* | 3/2014 | Dai et al. | 370/330 |

FOREIGN PATENT DOCUMENTS

| | | |
|---|---|---|
| EP | 2197235 A2 | 6/2010 |
| WO | 2011121112 A1 | 10/2011 |
| WO | 2012091663 A1 | 7/2012 |

OTHER PUBLICATIONS

3GPP R2-102795, "SCC status after handover and reconfiguration," CATT, pp. 1-2 (2010).
3GPP R2-102812, "Decision on Pcell/ Scell during handover," ZTE, CATT, CATR, pp. 1-3 (2010).
(Continued)

*Primary Examiner* — Steven H Nguyen
(74) *Attorney, Agent, or Firm* — Brundidge & Stanger, P.C.

(57) ABSTRACT

Various embodiments of a semi-joint scheduling algorithm for carrier aggregation in an LTE-Advanced system are provided. The proposed semi-joint scheduling algorithm combines the advantages of independent scheduling and joint scheduling while avoiding the respective shortcomings, and provides a technical foundation for a wide adoption of the carrier aggregation technology. This Abstract is submitted with the understanding that it will not be used to interpret or limit the scope or meaning of the claims.

11 Claims, 6 Drawing Sheets

(56) References Cited

OTHER PUBLICATIONS

3GPP R2-102883, "SCC reconfiguration and relation to Activation of SCC," Nokia Corporation, Nokia Siemens Networks, pp. 1-4 (2010).
3GPP R2-103009, "CC (de)activation status after reconfiguration," Huawei, pp. 1-3 (2010).
3GPP R2-103061, "Enhancements related to inter-eNB handover during CA," NTT DOCOMO, pp. 1-3 (2010).
3GPP R2-103108, "Explicit Uplink Activation/Deactivation," Ericsson, ST-Ericsson, pp. 1-3 (2010).
3GPP R2-103171, "Principles for Handover with Carrier aggregation," Motorola, pp. 1-3 (2010).
3GPP R2-103183, "Consideration on CA handover," Huawei, pp. 1-4 (2010).
3GPP R2-103223, "DL/UL CC activation and deactivation," NTT DOCOMO, Inc., pp. 1-3 (2010).
3GPP R2-103227, "CC activation status after handover," NTT DOCOMO, Inc., pp. 1-2 (2010).
3GPP R2-103235, "DL SCC status after HO," Samsung, pp. 1-2 (2010).
3GPP R2-103912, "[70#11] LTE CA: S-cell activation status after handover," Motorola, pp. 1-6 (2010).
3GPP R2-103982, "Discussion about Removal of Activation/Deactivation Concept," ITRI, pp. 1-3 (2010).
Bian, H., et al., "An ICSGC algorithm for carrier assignment in downlink coordinated multi-point with carrier aggregation," 2010 2nd IEEE International Conference on Network Infrastructure and Digital Content, pp. 934-938, (2010).
Chen, L., et al., "Analysis and Simulation for Spectrum Aggregation in LTE-Advanced System," IEEE 70th Vehicular Technology Conference Fall (VTC 2009—Fall), pp. 1-6, (2009).
Chung, Y-L., et al., "A quantized water-filling packet scheduling scheme for downlink transmissions in LTE-Advanced systems with Carrier Aggregation," 2010 International Conference on Software, Telecommunications and Computer Networks (SoftCOM), pp. 275-279 (2010).
Ghosh, A., et al., "LTE-Advanced: Next-Generation Wireless Broadband Technology [Invited Paper]," IEEE Wireless Communications, vol. 17, No. 3, pp. 10-22 (Jun. 2010).
Iwamura, M., et al., "Carrier aggregation framework in 3GPP LTE-advanced [WiMAX/LTE Update]," IEEE Communications Magazine, vol. 48, No. 8, pp. 60-67, Aug. 2010.
Jia, S., "Progress IMT-Advanced Chinese," Modern Telecom Technology, pp. 19-24 (Jan. 2007) (English Abstract).
Ratasuk, R., et al., "Carrier Aggregation in LTE-Advanced," 2010 IEEE 71st Vehicular Technology Conference (VTC 2010—Spring), pp. 1-5, (May 2010).
Songsong, S., et al., "A Resource Scheduling Algorithm Based on User Grouping for LTE-Advanced System with Carrier Aggregation," International Symposium on Computer Network and Multimedia Technology (CNMT 2009), pp. 1-4 (2009).
Wang, Y., et al., "Carrier load balancing methods with bursty traffic for LTE-Advanced systems," 2009 IEEE 20th International Symposium on Personal, Indoor and Mobile Radio Communications, pp. 22-26, (2009).
Xiaoyong, W., et al., "A norvel power allocation algorithm under CoMP with CA," 2nd IEEE International Conference on Broadband Network & Multimedia Technology, pp. 66-70 (2009).
Zhang, L., et al., "QoS performance analysis on carrier aggregation based LTE-A systems," IET International Communication Conference on Wireless Mobile and Computing (CCWMC 2009), pp. 253-256, pp. 7-9 (2009).
Zhang, L., et al., "Traffic load balance methods in the LTE-Advanced system with carrier aggregation," 2010 International Conference on Communications, Circuits and Systems (ICCCAS), pp. 63-67 (2010).
"Views for the LTE-Advanced requirements," Nokia & Nokia Siemens Networks, 3GPP TSG RAN IMT Advanced Workshop, pp. 1-16 (Apr. 7-8, 2008).
Jie, S., "Standard Progress [J] LTE-Advanced carrier aggregation Mobile Communications," vol. 21, pp. 30-32 (Sep. 25, 2010).
Ling, G., "Research Progress [J] LTE—A carrier aggregation in data communications," pp. 29-32 (2010).
International Search Report from International Application No. PCT/CN12/082682 mailed Jul. 18, 2013.
"Uplink Component Carrier Selection for LTE-Advanced Systems with Carrier Aggregation" by Wang, et al., 5 pgs., 2011.
"LTE-Advanced: The Roadmap to 4G Mobile Wireless Networks" by A. Kumar, et al., pp. 50-53, vol. 10, Issue 4, Version 1.0, Jun. 2010.
"Resource Allocation Considerations for Multi-Carrier LTE-Advanced Systems Operating in Backward Compatible Mode" Wang, et al., 5 pages, Sep. 2009.
"Carrier Load Balancing and Packet Scheduling for Multi-Carrier Systems" Wang, et al, IEEE Transactions of Wireless Communications, vol. 9, No. 4, Apr. 2010, pp. 1-10.

* cited by examiner

CARRIER SELECTION POLICY FOR JOINT SCHEDULING FOR CARRIER AGGREGATION IN AN LTE-ADVANCED SYSTEM

This Application is the National Stage filing under 35 U.S.C. §371 of PCT Application Ser. No. PCT/CN12/82682 filed on Oct. 10, 2012.

BACKGROUND

The Long Term Evolution Advanced standard, also known as LTE Advanced, LTE-Advanced or LTE-A, is a mobile communication standard adopted by the $3^{rd}$ Generation Partnership Project (3GPP) as a major enhancement of the LTE standard. The LTE-Advanced standard requires downstream transmission rates up to 1 Gbps and upstream transmission rates be up to 500 Mbps. However, a system bandwidth of 20 MHz as defined in the Release 8 standard is insufficient to meet the requirement of high transmission rates. Therefore, the LTE-Advanced system bandwidth is extended to 100 MHz in a time-division duplexing (TDD) model and to 40 MHz in a frequency-division duplexing (FDD) model to support the requirement of high transmission rates. Accordingly, carrier aggregation technology is proposed in the LTE-Advanced standard to support aggregation of multiple continuous or non-continuous frequency bands to achieve a resultant bandwidth of up to 100 MHz in the TDD model or 40 MHz in the FDD model for the entire system.

Under the carrier aggregation technology, each constituent carrier of the system bandwidth is called a component carrier (CC). In communication systems prior to the LTE-Advanced standard, multiple users within a distinct cell share one component carrier and the component carrier scheduling is based on one component carrier. However, with the carrier aggregation technology implemented in an LTE-Advanced system, carrier aggregation scheduling based on multiple component carriers, whether inter-band continuous or non-continuous, is required. The basic function of carrier aggregation is about whether and how to schedule a component carrier for a user. According to an established standard of 3GPP specification R10, currently there are two main types of component carrier scheduling: independent scheduling and joint scheduling.

With independent scheduling (also referred to as individual scheduling), a given user equipment attached to aggregated multiple component carriers can be scheduled by multiple schedulers. A typical scenario is that oncoming traffic, e.g., a queue of data packets awaiting for transmission, of a carrier aggregation user is loading to a component carrier randomly. There is not necessarily a component carrier selection process. When a given component carrier is selected for the traffic, resource blocks on a physical downlink shared channel (PDSCH) can be scheduled by using any scheduling policies such as, for example, maximum carrier-to-interface (Max C/I), proportionality fair (PF), or round robin (RR). If there is a data packet scheduler that is responsible for mapping the data packet(s) awaiting transmission to a corresponding component carrier, the scheduling can be independently conducted between multiple schedulers. Otherwise, one user queue is shared by each scheduler. Distributed control is adopted to decide which of the data packets can be transmitted on its own component carrier.

With joint scheduling, in contrast to independent scheduling, the schedulers implement centralized management of all the user queues and resources. The scheduler determines which component carrier, among multiple component carriers already attached to a given carrier aggregation user, is best-suited for an oncoming traffic according to information exchanged between component carrier schedulers. However, more signaling overhead is involved. This centralized management can make better use of multiple users' diversity gain and a frequency selective gain. Theoretically, joint scheduling tends to have better system performance than independent scheduling yet with greater complexity.

Thus, a fundamental difference between independent scheduling and joint scheduling is whether a component carrier selection process is used. Although independent scheduling tends to be simpler in terms of implementation, resource utilization in a system based on independent scheduling may be lower relative to joint scheduling. Further, although joint scheduling may result in relatively higher resource utilization, implementation of joint scheduling tends to be more complex.

SUMMARY

Described herein are systems, apparatuses, methods, and techniques related to a semi-joint scheduling algorithm for carrier aggregation in an LTE-Advanced system. In at least one aspect, a method may include obtaining buffer status of a plurality of buffers of a plurality of component carrier schedulers. Each of the plurality of schedulers may independently schedule respective resource blocks to transmit respectively distributed data packets utilizing a corresponding component carrier as part of carrier aggregation in a communication system. The buffer status of each of the respective buffers may indicate efficiency in distributing respective resource blocks of a respective one of the plurality of component carrier schedulers. The method may further include distributing a flow of a plurality of data packets from a plurality of communication devices among the plurality of buffers of the plurality of component carrier schedulers according to the buffer status of the plurality of buffers.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are techniques related to a semi-joint scheduling algorithm for carrier aggregation in an LTE-Advanced system. According to the proposed scheme, component carrier selection policy for joint scheduling is modified by utilizing a performance index on each component carrier in the selection process. The performance index indicates a state of the respective component carrier and implies the state of other component carriers. More specifically, independent scheduling is utilized as the core of semi-joint scheduling of traffic flow of data packets for transmission. The buffer status of each component carrier is selected as a benchmark of flow distribution of a respective component carrier scheduler. The buffer status not only is related to the capacity utilization of the respective component carrier, but it also represents some degree of natural association with an occupancy status of the other component carriers in the system. When the buffer status of a component carrier is in a full state, there may be a problem in the efficiency of the respective component carrier. In this situation it is likely that other component carriers are utilized to carry the traffic flow. Accordingly, the ability of comprehensive utilization of resources of joint scheduling may be achieved without information exchange between the component carriers.

Overview

A critical challenge for carrier aggregation involves determining a best-suited component carrier, from among multiple component carriers concurrently attached to a given carrier aggregation user, to accommodate the traffic for the user. Between the two existing solutions, independent scheduling and joint scheduling, the approach under independent scheduling uses a random process in handling each component carrier or, alternatively, uses a preset rule such as, for example, round robin. On the other hand, the approach under joint scheduling determines a best-suited component carrier for a given user, for example, by using a middleware to exchange information between component carrier schedulers within the respective eNB (herein interchangeably referred to as "base station") or by using X2 interface to exchange information with carriers associated with neighboring base stations. The exchanged information could be scheduling information and/or an overload index, which may involve extra signaling overhead that may result in deteriorated user experience, e.g., delay.

Under the proposed scheme of the present disclosure, a performance index that indicates a state of the respective component carrier and implies the state of other component carriers is utilized in the scheduling of component carriers. Accordingly, there is no need for information exchange between component carrier schedulers during a modified joint scheduling process while still achieving the same or near-the-same performance based on joint scheduling.

The performance index utilized under the proposed scheme of the present disclosure, such as, for example, received interference power (RIP) or buffer state information (BSI), can implicitly indicate both wireless channel quality and load status on each component carrier. The RIP reflects whether the respective component carrier is in a good or bad condition as the RIP indicates the amount of interference received from neighboring carriers. If the RIP is relatively high, it means it is time to reduce the load on the respective component carrier; otherwise, the load can be increased. The BSI also indicates whether the respective component carrier is in a good or bad condition. If the BSI indicates a good condition, it means the load in the buffer of the respective scheduler will quickly run out; otherwise, the load is deterred in the buffer. Thus, information provided by the RIP and BSI is a good indicator of the status of the scheduler in a given base station. Under the proposed scheme of the present disclosure, when a new user is in need of a component carrier, the base station selects one of the available component carriers depending on one or more of the base station's own performance indices without involving information exchange between the component carriers. Example of such performance indices include, for example, BSI, RIP, BSI+RIP, channel quality indicator (CQI) plus RIP (CQI+RIP), modulation and coding scheme (MCS) plus RIP (MCS+RIP), CQI+BSI, CQI+BSI+RIP, etc.

With independent scheduling, a scheduler accommodates new traffic of a carrier aggregation user by selecting resource blocks of PDSCHs on a particular component carrier to carry the new traffic. Basically, the selection of resource blocks on the particular component carrier depends on the CQI that indicates wireless channel quality, e.g., Max C/I, PF, RR. With joint scheduling, a scheduler accommodates new traffic of a carrier aggregation user by selecting a component carrier from among a plurality of candidate component carriers to carry the new traffic. The scheduler compares wireless channel quality of the candidate component carriers, for example, to exchange scheduling information between component carrier schedulers or to use overload index between the component carriers, and then rank the candidate component carriers to select one of the candidate component carriers that is best-suited in terms of wireless channel quality or load status. The scheduler allocates resource blocks from the selected component carrier to carry the new traffic, and may use existing scheduling policy/policies such as, for example, Max C/I, PF, RR.

Under the proposed scheme of the present disclosure, a scheduler selects a component carrier from among a plurality of candidate component carriers, to accommodate new traffic of a carrier aggregation user, by finding a best-suited component carry without information exchange between component carrier schedulers. The proposed scheme determines a metric that can reflect, explicitly or implicitly, wireless channel quality and/or load status of each component carrier and associated component carriers. For example, RIP can be used as the performance index as RIP explicitly reflects how much interference is experienced by a given component carrier. The RIP of a given component carrier also implicitly reflects in what state the associated component carriers are. As another example, as each component carrier has a buffer associated therewith, BSI can be used as the performance index. When the BSI indicates the traffic in the associated buffer is running out fast, it means the associated component carrier is in a good condition. Under the proposed scheme, resource blocks can be assigned for the new traffic on the selected component carrier based on existing scheduling policy/policies such as, for example, Max C/I, PF, RR.

A number of features, and the associated benefits, of the proposed scheme are highlighted below.

Firstly, compared with independent scheduling, the proposed scheme has a component carrier selection process, and scheduling policy of resource blocks on PDSCH can be implemented the same as with independent scheduling. Compared with joint scheduling, the proposed scheme selects a component carrier depending on a performance index of the component carriers without any information exchange between the component carriers.

Secondly, the metric, or performance index, used by the proposed scheme in component carrier selection indicates the wireless channel quality and/or load status of the respective component carrier, whether explicitly or implicitly, and implicitly indicates the load status of associated component carriers. Existing metrics such as RIP, BSI, and the like can be used as the performance index.

Thirdly, each candidate metric used as the performance index under the proposed scheme reflects the wireless channel quality and load status of a respective component carrier, in addition to implicitly reflecting the status of other component carriers, because such performance indices are constantly updated and thus are indicative of the status of the respective scheduler. For example, the BSI of a given component carrier indicates the load status directly, but also reveals wireless channel quality implicitly, e.g., when packets in a buffer are delivered fast, it means a given component carrier is in a good condition. As another example, when the RIP is relatively higher, it means the respective component carrier is suffering from strong interference. It also implicitly means that the load on the respective component carrier needs to be scaled down.

Fourthly, the candidate performance indices, e.g., RIP, BSI, etc., may be used individually or in combination such as, for example, RIP, BSI, RIP, RIP+BSI.

Fifthly, the performance indices may be formed by using the aforementioned special indices (e.g., RIP, BSI) in combination with one or more common performance indices (e.g., CQI, MSC) such as, for example, CQI+RIP, MCS+RIP, CQI+BSI, CQI+BSI+RIP, etc. The common performance indices merely indicate the wireless channel quality of the respective component carrier but do not indicate the state of associated component carriers.

Sixthly, compared with independent scheduling and joint scheduling algorithms, the semi-joint scheduling algorithm of the proposed scheme uses system performance indices, e.g., BSI, RIP, as a metric in component carrier selection, without involving extra signaling overhead.

Seventhly, the semi-joint scheduling algorithm of the proposed scheme uses a performance index on a given component carrier to determine whether the given component carrier is in a good enough condition to carry the new traffic. Compared with joint scheduling, it is not necessary to exchange scheduling information between component carrier schedulers under the proposed scheme.

Eighthly, under the proposed scheme, while a performance index is used for component carrier selection, any scheduling algorithm can be used for scheduling policy on each component carrier whether a given component carrier is in a good or bad condition. Compared with joint scheduling, it is not necessary to exchange scheduling information between component carrier schedulers under the proposed scheme.

Figure 1:
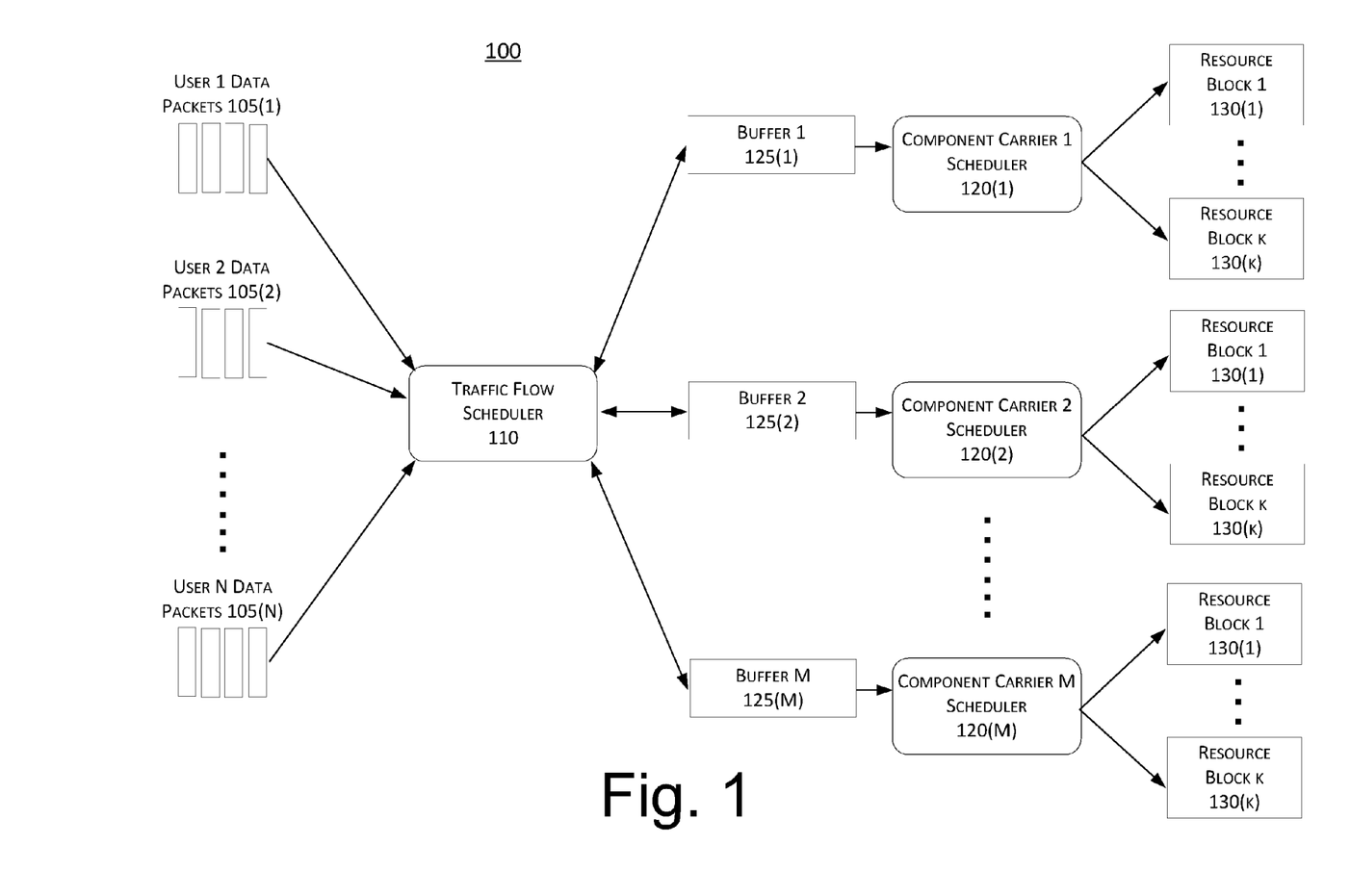
FIG. 1 shows a scheme that implements a semi-joint scheduling algorithm for carrier aggregation in an LTE-Advanced system.

FIG. 1 shows a scheme 100 that implements a semi-joint scheduling algorithm for carrier aggregation in an LTE-Advanced system.

Scheme 100 utilizes a semi-joint scheduling algorithm to achieve an optimal balance between traffic flow and system capacity. Scheme 100 includes a traffic flow scheduler 110, a plurality of traffic flows of data packets 105(1)-105(n) for n users, a plurality of component carrier schedulers 120(1)-120 (m) for m component carriers, a plurality of buffers 125(1)-125(m) each corresponding to a respective one of the component carrier schedulers 120(1)-120(m), and a respective plurality of resource blocks 130(1)-130(k) associated with each one of the component carrier schedulers 120(1)-120(m). Hereafter, the terms "user", "user equipment" and "communication device" are used interchangeably.

Scheme 100 may initialize a buffer status of each component carrier in carrier aggregation by setting a respective value to 0. Additionally, the traffic flow scheduler 110 may be initialized. The traffic flow of data packets 105(1)-105(n) of the n users are evenly distributed by the traffic flow scheduler 110 among the buffers 125(1)-125(m) of the m component carriers. Each of the component carrier schedulers 120(1)-120(m) then schedules resource blocks, in terms of frequency and time, according to one or more parameters such as, for example, channel quality indicator (CQI), power, a combination thereof or other factors to host the respective traffic flow.

After a certain period of time (e.g., 1 ms), which may be adjusted depending on the circumstances, traffic flow is re-distributed and updated by the traffic flow scheduler 110 for each of the buffers 125(1)-125(m) of the m component carriers. For example, it may be set up so that during times of heavy traffic flow the traffic flow is re-distributed and updated by the traffic flow scheduler 110 every 1 ms, and during times of light traffic flow the traffic flow is re-distributed and updated by the traffic flow scheduler 110 every 5 ms. Traffic flow distribution of each of the buffers 125(1)-125(m) is updated, for example, according to the following formula:

$$B_i = R_i' + \left[1 - \frac{R_i'}{R_B}\right] \times \Delta R.$$

Here, $B_i$ represents a flow distribution to be updated on an $i^{th}$ buffer of the plurality of buffers 125(1)-125(m), $R_i'$ represents a remaining flow of data packets on the $i^{th}$ buffer, $R_B$ represents a depth of each of the plurality buffers 125(1)-125 (m) (assuming the depths of the buffers 125(1)-125(m) are the same), and $\Delta R$ represents a basic unit of the distributed flow of data packets with $0 < \Delta R < R_B$. $\Delta R > 0$ denotes that there is a new distribution of the traffic flow until all data packets of the respective traffic flow are disposed of completely, at which time $\Delta R = 0$. $\Delta R < R_B$ denotes that, upon an instance of flow distribution and update, the respective buffer is not filled up completely and more data packets may be distributed to the buffer according to an actual processing condition of the traffic flow. In one implementation, greater traffic flow may be directed (e.g., more data packets may be added) to the buffer of a given component carrier which is transmitted relatively faster by the respective component carriers scheduler. Conversely, less traffic flow may be directed (e.g., fewer data packets may be added) to the buffer of a given component carrier which is transmitted relatively slower by the respective component carrier scheduler to ensure that the respective user's traffic flow is treated fairly on each component carrier.

This method of flow distribution and update takes into account two principles. First, if the remaining flow of data packets of a given buffer is relatively large compared to that of other buffers or an average amount of remaining flow of data packets of the plurality of buffers, the utilization efficiency of the resource blocks of the respective component carrier is deemed to be relatively low compared to that of other buffers or an average utilization efficiency of the plurality of buffers. When updating the distribution of the respective traffic flow, less flow is allocated to the given buffer. Second, if the flow of a given buffer is disposed of completely, the utilization efficiency of the resource blocks of the respective component carrier is deemed to be relatively high compared to that of other buffers or the average utilization efficiency of the plurality of buffers. When updating the distribution of the respective traffic flow, more flow is allocated to the given buffer.

The component carrier schedulers $120(1)$-$120(m)$ of each component carrier continues to schedule the respective resource blocks $130(1)$-$130(k)$ according to a certain parameter (e.g., CQI or power, among others) to host the respective traffic flow. The above-described algorithm of periodic monitoring of buffer status and re-distribution and update of traffic flow is repeated over time until the traffic flow associated with each user is completely transmitted, at which time the algorithm ends. As will be appreciated by those skilled in the art, the proposed semi-joint scheduling algorithm combines the advantages of independent scheduling and joint scheduling while avoiding the respective shortcomings, and provides a technical foundation for a wide adoption of the carrier aggregation technology.

Exemplary Processes

Figure 2:
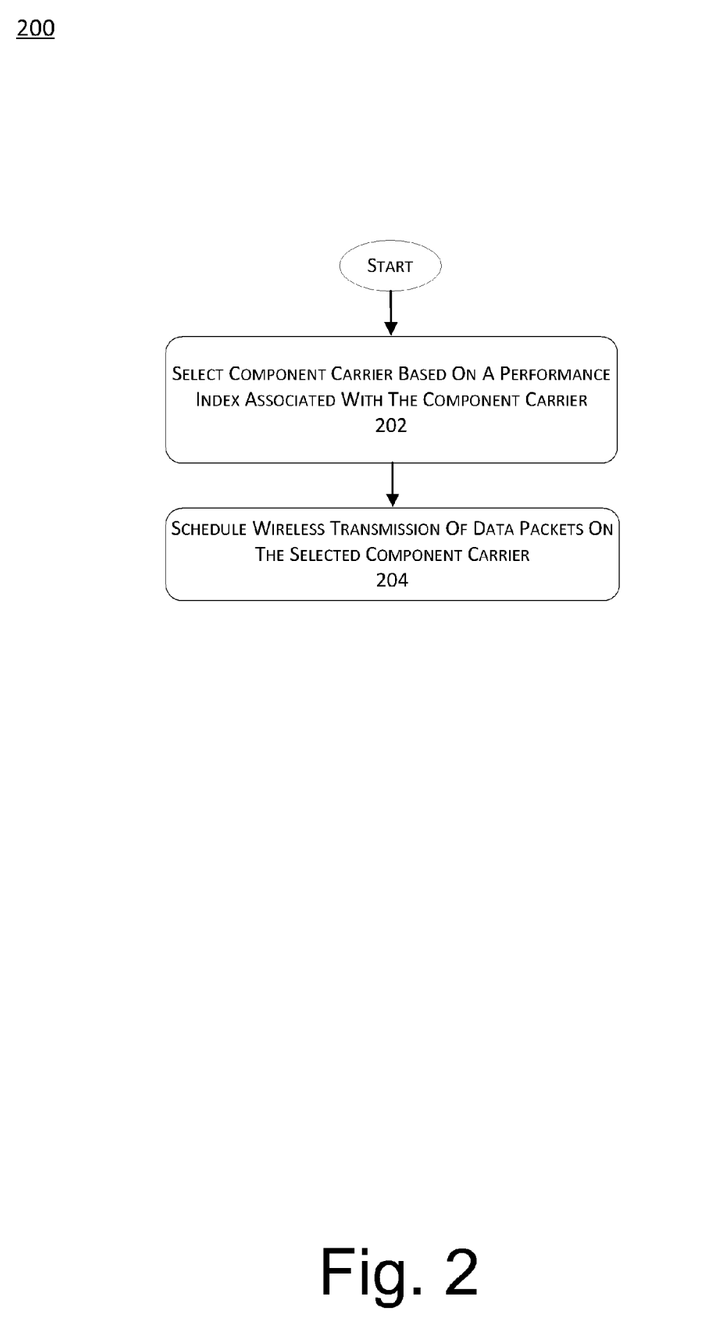
FIG. 2 shows a processing flow in accordance with one or more embodiments of a semi-joint scheduling algorithm for carrier aggregation in an LTE-Advanced system.

FIG. 2 shows a processing flow 200 in accordance with one or more embodiments of a semi-joint scheduling algorithm for carrier aggregation in an LTE-Advanced system.

Figure 6:
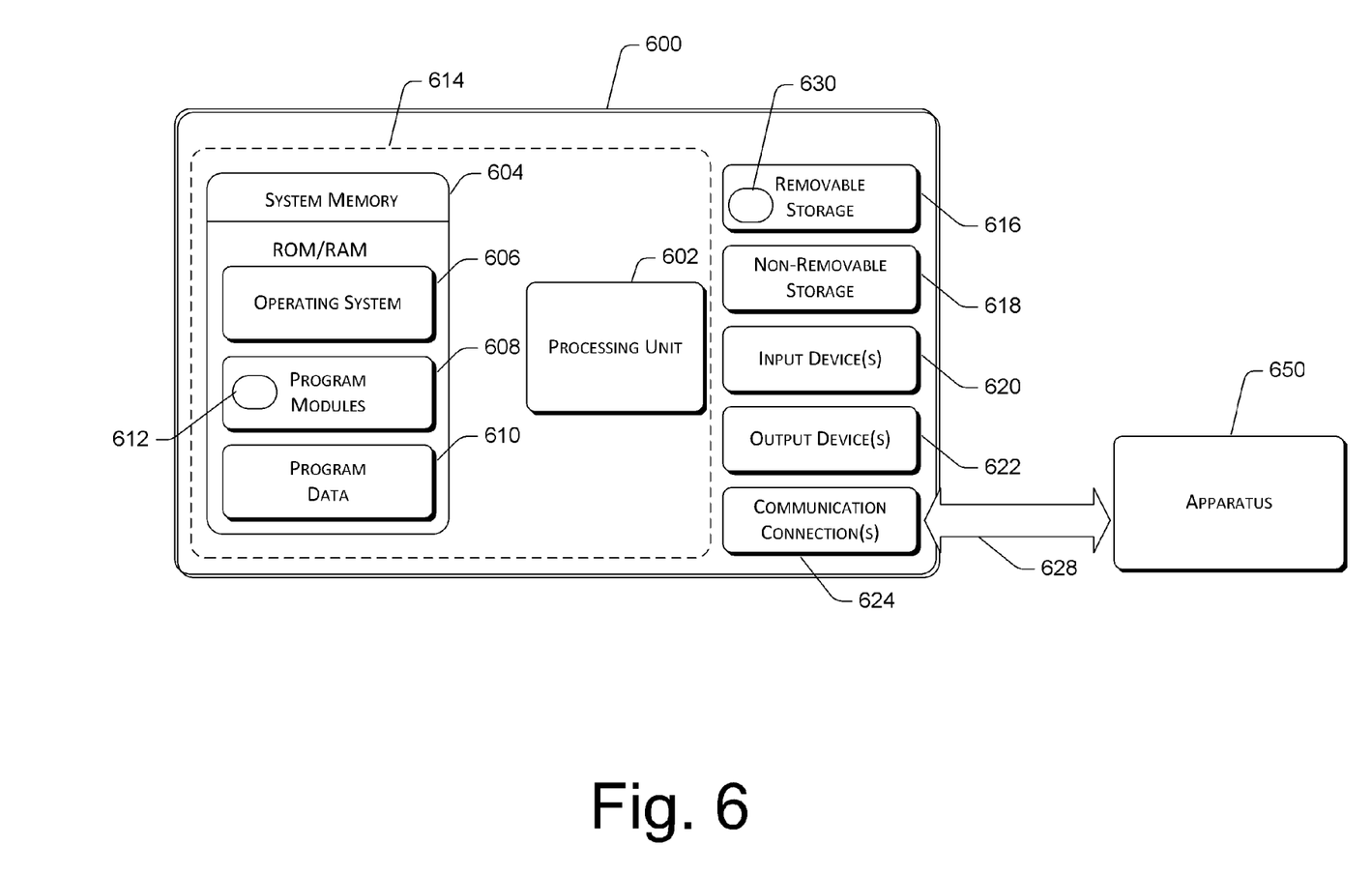
FIG. 6 shows an example computing device that is configured to implement operations of one or more embodiments of a semi-joint scheduling algorithm for carrier aggregation in an LTE-Advanced system.

Example processing flow 200 includes one or more operations, actions, or functions as illustrated by one or more of blocks 202 and 204. Although illustrated as discrete blocks, various blocks may be divided into additional blocks, combined into fewer blocks, or eliminated, depending on the desired implementation. Further, processing flow 200 may be implemented in one or more base stations, a central office associated with the one or more base stations, and/or an example computing device 600, to be described below. Processing flow 200 may begin at block 202.

Block 202 (Select Component Carrier Based On A Performance Index Associated With The Component Carrier) includes selecting a first component carrier from a plurality of component carriers based on a performance index associated with the first component carrier. The performance index indicates either or both of wireless channel quality and load status with respect to the first component carrier being in a condition that allows the first component carrier to carry a plurality of data packets. The performance index further indicates load status of at least a second component carrier of the plurality of component carriers. For example, the performance index may include RIP, BSI, or RIP+BSI with respect to the first component carrier. Moreover, the performance index may include either or both of RIP and BSI plus one or more other performance indices such as CQI and MCS, in that the performance index may be CQI+RIP, MCS+RIP, CQI+BSI, CQI+BSI+RIP, etc.

Block 204 (Schedule Wireless Transmission of Data Packets On The Selected Component Carrier) includes scheduling wireless transmission of one or more of the plurality of data packets on the first component carrier. For example, the scheduling may be based on Max C/I, PF, or RR.

Figure 3:
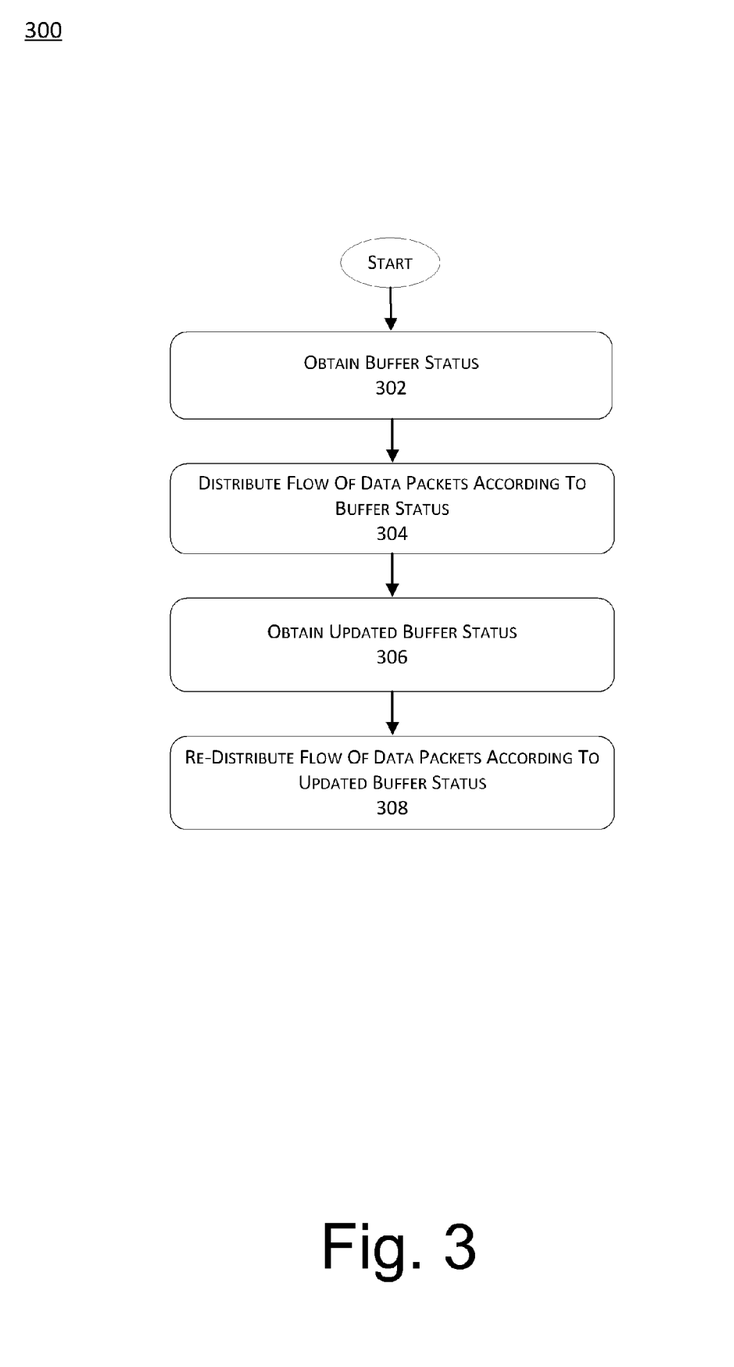
FIG. 3 shows another processing flow in accordance with one or more embodiments of a semi-joint scheduling algorithm for carrier aggregation in an LTE-Advanced system.

FIG. 3 shows a processing flow 300 in accordance with one or more embodiments of a semi-joint scheduling algorithm for carrier aggregation in an LTE-Advanced system.

Example processing flow 300 includes one or more operations, actions, or functions as illustrated by one or more of blocks 302, 304, 306 and 308. Although illustrated as discrete blocks, various blocks may be divided into additional blocks, combined into fewer blocks, or eliminated, depending on the desired implementation. Further, processing flow 300 may be implemented in one or more base stations, a central office associated with the one or more base stations, and/or an example computing device 600, to be described below. Processing flow 300 may begin at block 302.

Block 302 (Obtain Buffer Status) includes obtaining buffer status of a plurality of buffers of a plurality of component carrier schedulers, with each of the plurality of schedulers independently scheduling respective resource blocks to transmit respectively distributed data packets utilizing a corresponding component carrier as part of carrier aggregation in a communication system. The buffer status for each of the respective buffers indicates efficiency in distributing respective resource blocks of a respective one of the plurality of component carrier schedulers. For example, the traffic flow scheduler 110 obtains a status of each of the buffers 125(1)-125(m) on a periodic basis, with the periodicity being adjustable.

Block 304 (Distribute Flow Of Data Packets According To Buffer Status) includes distributing a flow of a plurality of data packets from a plurality of communication devices among the plurality of buffers of the plurality of component carrier schedulers according to the buffer status of the plurality of buffers. For example, according to the status of the buffers 125(1)-125(m), the traffic flow scheduler 110 distributes each of the flows of data packets 105(1)-105(n) of users 1-n to the plurality of buffers 125(1)-125(m) for scheduling by the component carrier schedulers 120(1)-120(m).

In at least some implementations, the operation of distributing includes allocating a first number of data packets to a first buffer of the plurality of buffers and allocating a second number of data packets to a second buffer of the plurality of buffers in response to: (1) the first number being less than the second number, and (2) a respective buffer status of the first buffer and a respective buffer status of the second buffer indicating an amount of a remaining flow of data packets on the first buffer is greater than an amount of a remaining flow of data packets on the second buffer. For example, the traffic flow scheduler 110 may allocate more data packets to buffer 125(2) and less data packets to buffer 125(1) in a given round of distribution of data packets in response to the buffer status of buffer 125(1) and the buffer status of buffer 125(2) indicating that there is a greater amount of respective data packets remaining in buffer 125(1) than in buffer 125(2) to be scheduled for transmission by component carrier scheduler 120(1) and component carrier scheduler 120(2), respectively.

In at least some implementations, the operation of distributing utilizes the following formula:

$$B_i = R_i' + \left[1 - \frac{R_i'}{R_B}\right] \times \Delta R.$$

Here, $B_i$ represents a flow distribution to be updated on an $i^{th}$ buffer of the plurality of buffers, $R_i'$ represents a remaining flow of data packets on the $i^{th}$ buffer, $R_B$ represents a depth of each of the plurality buffers, and $\Delta R$ represents a basic unit of the distributed flow of data packets with $0<\Delta R<R_B$.

In at least some implementations, processing flow 300 further includes blocks 306 and 308.

Block 306 (Obtain Updated Buffer Status) includes obtaining an updated buffer status of the plurality of buffers at a later time. For example, the traffic flow scheduler 110 periodically obtains buffer status of the buffers 125(1)-125(m) as the buffer status of each of the buffers 125(1)-125(m) is updated periodically to reflect respective amounts of data packets remaining in the respective buffers at any given time.

Block 308 (Re-Distribute Flow Of Data Packets According To Updated Buffer Status) includes re-distributing the flow of the plurality of data packets from the plurality of communication devices among the plurality of buffers of the plurality of component carrier schedulers, according to the updated buffer status of the plurality of buffers. For example, for the n users, the traffic flow scheduler 110 re-distributes the flows of data packets 105(1)-105(n) of the users among the plurality of buffers 125(1)-125(m) of component carrier schedulers 120(1)-120(m) according to the updated buffer status of the plurality of buffers 125(1)-125(m).

In at least some implementations, processing flow 300 initializes a value of a respective buffer status of at least one of the plurality of buffers before the distributing. For example, when the algorithm of the present disclosure is initiated, the buffer status of one or more of the plurality of buffers 125(1)-125(m) is initialized (e.g., set to a predefined value such as 0 for example) before the data packets are distributed to the plurality of buffers 125(1)-125(m).

Figure 4:
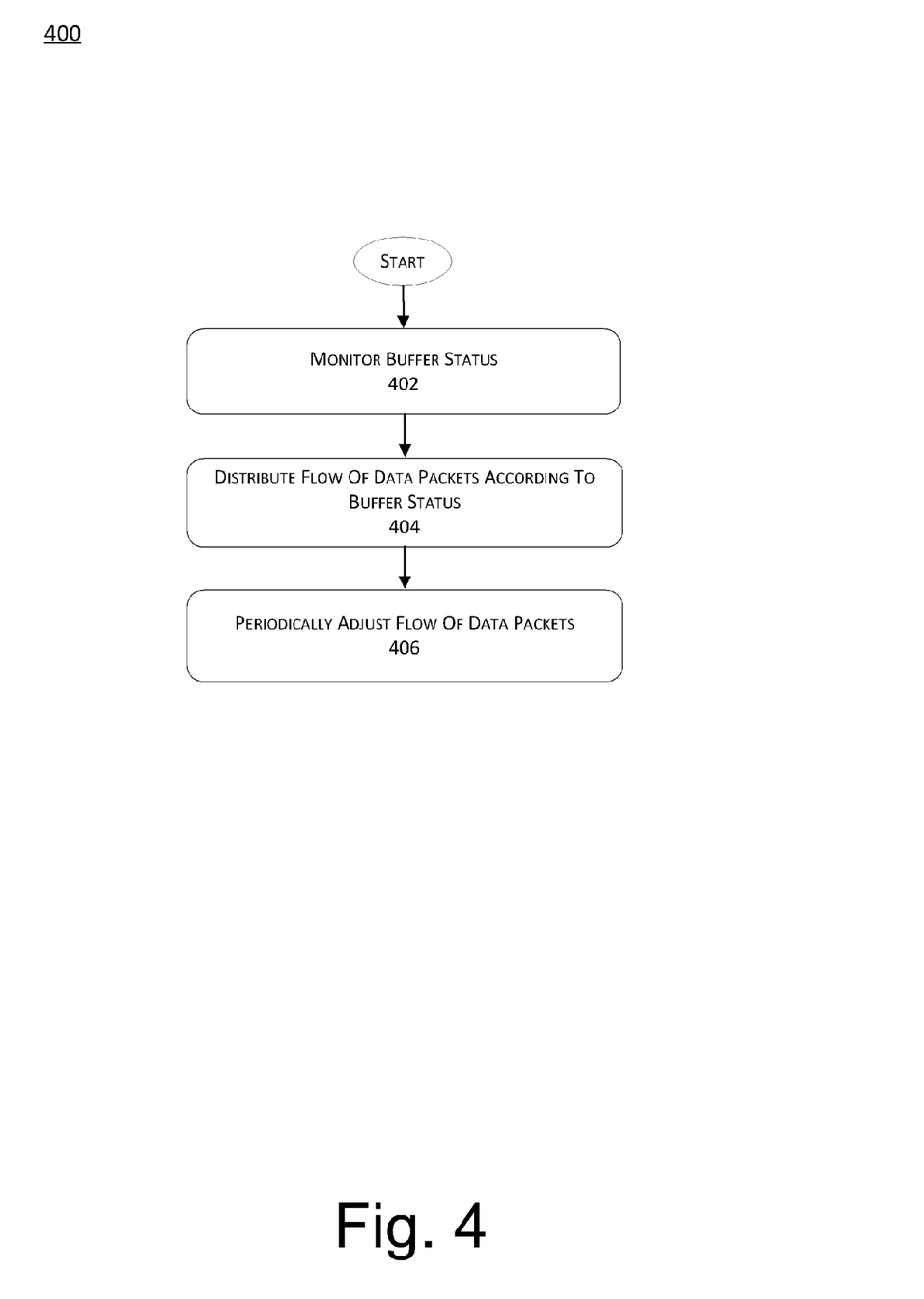
FIG. 4 shows yet another processing flow in accordance with one or more embodiments of a semi-joint scheduling algorithm for carrier aggregation in an LTE-Advanced system.

FIG. 4 shows a processing flow 400 in accordance with one or more embodiments of a semi-joint scheduling algorithm for carrier aggregation in an LTE-Advanced system.

Example processing flow 400 includes one or more operations, actions, or functions as illustrated by one or more of blocks 402, 404 and 406. Although illustrated as discrete blocks, various blocks may be divided into additional blocks, combined into fewer blocks, or eliminated, depending on the desired implementation. Further, processing flow 400 may be implemented in one or more base stations, a central office associated with the one or more base stations, and/or an example computing device 600. Processing flow 400 may begin at block 402.

Block 402 (Monitor Buffer Status) includes monitoring a buffer status of a plurality of buffers. A respective buffer status of each of the plurality of buffers indicates efficiency in distributing resource blocks of a respective one of a plurality of component carrier schedulers. Each of the component carrier schedulers independently schedules respective resource blocks to transmit respectively distributed data packets utilizing a corresponding component carrier as part of carrier aggregation in a communication system. For example, the traffic flow scheduler 110 monitors the buffer status of the plurality of buffers 125(1)-125(m).

Block 404 (Distribute Flow Of Data Packets According To Buffer Status) includes distributing a flow of a plurality of data packets from a plurality of communication devices among the plurality of buffers of the plurality of component carrier schedulers according to the buffer status of the plurality of buffers. For example, according to the status of the buffers 125(1)-125(m), the traffic flow scheduler 110 distributes each of the flows of data packets 105(1)-105(n) of users 1-n to the plurality of buffers 125(1)-125(m) for scheduling by the component carrier schedulers 120(1)-120(m).

Block 406 (Periodically Adjust Flow Of Data Packets) includes periodically adjusting the flow of the plurality of data packets distributed among the plurality of buffers in response to changes in the monitored buffer status of the plurality of buffers. For example, depending on changes in the monitored buffer status of the plurality of buffers 125(1)-125(m), the traffic flow scheduler 110 adjusts the distribution of flows of data packets 105(1)-105(n) among the plurality of buffers 125(1)-125(m).

In at least some embodiments, the operation of distributing includes allocating a first number of data packets to a first buffer of the plurality of buffers and allocating a second number of data packets to a second buffer of the plurality of buffers in response to: (1) the first number being less than the second number, and (2) a respective buffer status of the first buffer and respective buffer status of the second buffer indicating an amount of a remaining flow of data packets on the first buffer is greater than an amount of a remaining flow of data packets on the second buffer. For example, the traffic flow scheduler 110 allocates more data packets to buffer 125(2) and less data packets to buffer 125(1) in a given round of distribution of data packets in response to the buffer status of buffer 125(1) and the buffer status of buffer 125(2) indicating there is a greater amount of respective data packets remaining in buffer 125(1) than in buffer 125(2) to be scheduled for transmission by component carrier scheduler 120(1) and component carrier scheduler 120(2), respectively.

In at least some implementations, the operation of distributing utilizes the following formula:

$$B_i = R'_i + \left[1 - \frac{R'_i}{R_B}\right] \times \Delta R.$$

Here, $B_i$ represents a flow distribution to be updated on an $i^{th}$ buffer of the plurality of buffers, $R_i'$ represents a remaining flow of data packets on the $i^{th}$ buffer, $R_B$ represents a depth of each of the plurality buffers, and $\Delta R$ represents a basic unit of the distributed flow of data packets with $0<\Delta R<R_B$.

In at least some implementations, processing flow 400 initializes a value of a respective buffer status of at least one of the plurality of buffers before the distributing. For example, when the algorithm of the present disclosure is initiated, the buffer status of one or more of the plurality of buffers 125(1)-125(m) is initialized (e.g., set to a predefined value such as 0 for example) before the data packets are distributed to the plurality of buffers 125(1)-125(m).

Figure 5:
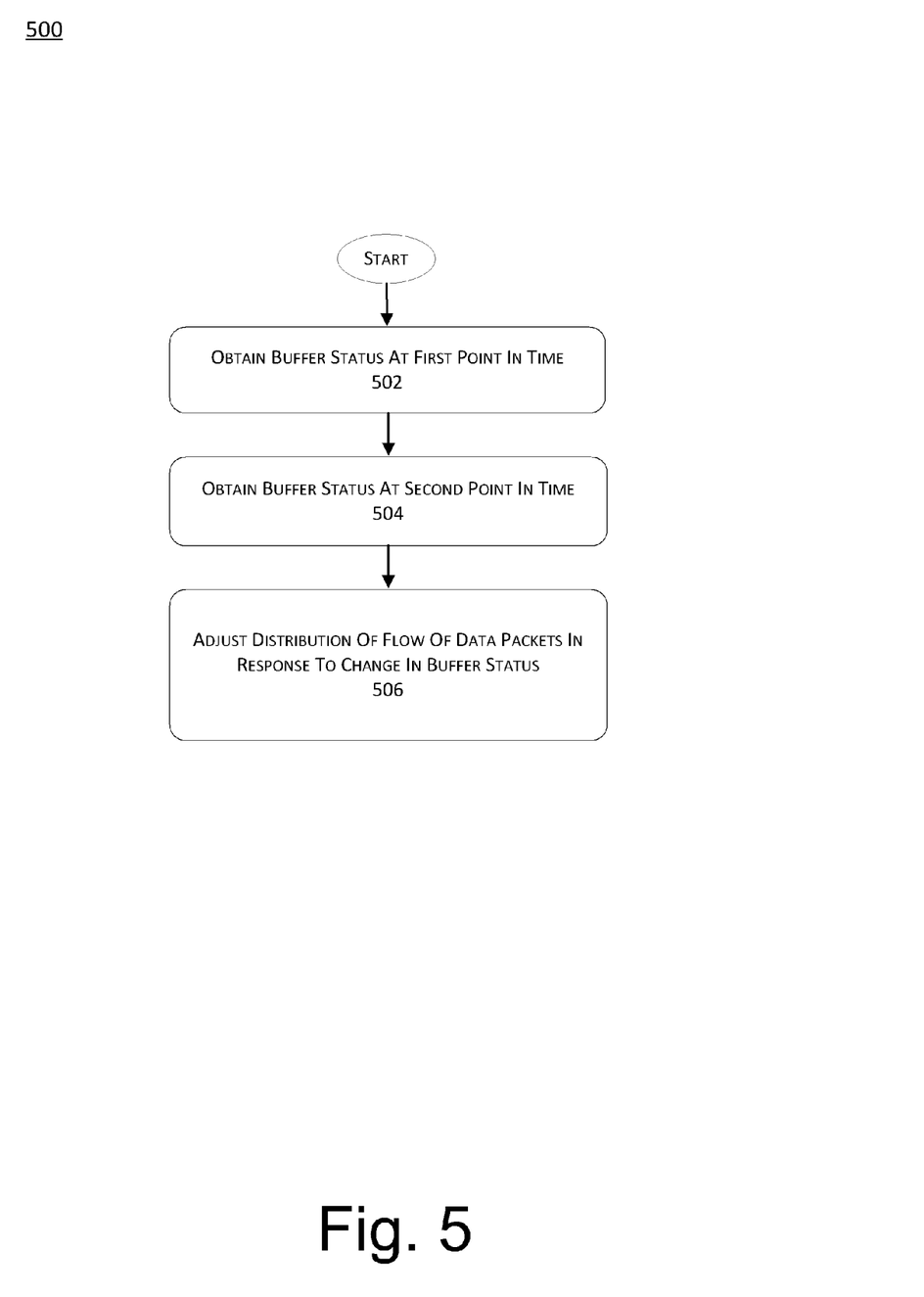
FIG. 5 shows still another processing flow in accordance with one or more embodiments of a semi-joint scheduling algorithm for carrier aggregation in an LTE-Advanced system.

FIG. 5 shows a processing flow 500 in accordance with one or more embodiments of a semi-joint scheduling algorithm for carrier aggregation in an LTE-Advanced system.

Example processing flow 500 includes one or more operations, actions, or functions as illustrated by one or more of blocks 502, 504 and 506. Although illustrated as discrete blocks, various blocks may be divided into additional blocks, combined into fewer blocks, or eliminated, depending on the desired implementation. Further, processing flow 500 may be implemented in one or more base stations, a central office associated with the one or more base stations, and/or an example computing device 600. Processing flow 500 may begin at block 502.

Block 502 (Obtain Buffer Status At First Point In Time) includes obtaining, at a first point in time, first buffer status of a plurality of buffers of a plurality of component carrier schedulers, with each of the plurality of schedulers independently scheduling respective resource blocks to transmit respectively distributed data packets utilizing a corresponding component carrier as part of carrier aggregation in a communication system. For example, the traffic flow scheduler 110 obtains buffer status of the plurality of buffers 125(1)-125(m) at a first point in time.

Block 504 (Obtain Buffer Status At Second Point In Time) includes obtaining, at a second point in time after the first point in time, second buffer status of the plurality of buffers of the plurality of component carrier schedulers. For example, sometime later at a second point in time, the traffic flow scheduler 110 again obtains buffer status of the plurality of buffers 125(1)-125(m), which is different from that at the first point in time.

Block 506 (Adjust Distribution Of Flow Of Data Packets In Response To Change In Buffer Status) includes adjusting a distribution of a flow of a plurality of data packets from a plurality of communication devices among the plurality of buffers of the plurality of component carrier schedulers in response to a difference between the first buffer status and the second buffer status of the plurality of buffers. For example, depending on changes in the monitored buffer status of the plurality of buffers 125(1)-125(m), the traffic flow scheduler 110 adjusts the distribution of flows of data packets 105(1)-105(n) among the plurality of buffers 125(1)-125(m).

In at least some embodiments, the operation of adjusting the distribution includes allocating a first number of data packets to a first buffer of the plurality of buffers and allocating a second number of data packets to a second buffer of the plurality of buffers in response to: (1) the first number being less than the second number, and (2) a respective buffer status of the first buffer and a respective buffer status of the second buffer indicating an amount of a remaining flow of data packets on the first buffer is greater than an amount of a remaining flow of data packets on the second buffer. For example, the traffic flow scheduler 110 allocates more data packets to buffer 125(2) and less data packets to buffer 125(1) in a given round of distribution of data packets in response to the buffer status of buffer 125(1) and the buffer status of buffer 125(2) indicating there is a greater amount of respective data packets remaining in buffer 125(1) than in buffer 125(2) to be scheduled for transmission by component carrier scheduler 120(1) and component carrier scheduler 120(2), respectively.

In at least some implementations, the distribution of the flow of the plurality of data packets utilizes the following formula:

$$B_i = R_i' + \left[1 - \frac{R_i'}{R_B}\right] \times \Delta R.$$

Here, $B_i$ represents a flow distribution to be updated on an $i^{th}$ buffer of the plurality of buffers, $R_i'$ represents a remaining flow of data packets on the $i^{th}$ buffer, $R_B$ represents a depth of each of the plurality of buffers, and $\Delta R$ represents a basic unit of the distributed flow of data packets with $0<\Delta R<R_B$.

In at least some implementations, processing flow 500 initializes a value of a respective buffer status of at least one of the plurality of buffers before the distribution of the flow of the plurality of data packets. For example, when the algorithm of the present disclosure is initiated, the buffer status of one or more of the plurality of buffers 125(1)-125(m) is initialized (e.g., set to a predefined value such as 0 for example) before the data packets are distributed to the plurality of buffers 125(1)-125(m).

The proposed scheme of semi-joint scheduling utilizes independent scheduling in terms of system resource scheduling, thereby maintaining the characteristic of simple operation of independent scheduling. Moreover, the proposed scheme of semi-joint scheduling is capable of comprehensive utilization of system resource capacities between the component carriers, thereby achieving the characteristic of high resource utilization of joint scheduling. The proposed scheme provides an intelligent distribution and update of a plurality of users and corresponding traffic flows on a plurality of component carriers without the need of information exchange between a plurality of component carrier schedulers associated with the plurality of component carriers. Thus, the proposed scheme of semi-joint scheduling combines the advantages of independent scheduling and joint scheduling while following existing standardization scheme as both independent scheduling and joint scheduling belong to one of the standardization schemes of the carrier aggregation technology. By implementing the proposed scheme of semi-joint scheduling, operational overhead can be expected to decrease and, at the same time, stability and reliability of the system can be expected to increase.

Exemplary Computing Device

FIG. 6 shows an example computing device 600 that is configured to implement operations of one or more embodiments of a semi-joint scheduling algorithm for carrier aggregation in an LTE-Advanced system.

It will be readily appreciated that the techniques disclosed herein may be implemented in other computing devices, systems, and environments. The computing device 600 shown in FIG. 6 is one example of a computing device and is not intended to suggest any limitation as to the scope of use or functionality of the computer and network architectures.

In at least one implementation, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608, and may include program data 610. A basic implementation of the computing device 600 is demarcated by a dashed line 614. In at least one embodiment, computing device 600 may be a part of a base station and/or a central office associated with the base station where the proposed scheme of semi-joint scheduling algorithm for carrier aggregation in an LTE-Advanced system is implemented. In at least another embodiment, computing device 600 may be a computing device that is communicatively coupled to the base station and/or a central office associated with the base station.

The program module 608 may include a module 612 configured to implement the dynamic activation and release of the carrier aggregation technology in an LTE-Advanced system as described above. For example, the module 612 include a set of computer-executable instructions or program codes that, when executed by the processing unit 602, may cause the processing unit 602 to carry out processing flows 200, 300, 400 and/or 500 and any variations thereof, e.g., the computing device 600 performing the operations as described above with respect to processing flows 200, 300, 400 and/or 500.

Computing device 600 may have additional features or functionality. For example, computing device 600 may also include additional data storage devices such as removable storage 616 and non-removable storage 618. In at least some implementations, the removable storage 616 and non-removable storage 618 are an example of computer accessible media for storing computer-executable instructions or program codes that are executable by the processing unit 602 to perform the various functions described above. Generally, any of the functions described with reference to the figures can be implemented using software, firmware, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 600. Any of such computer accessible media may be part of the computing device 600.

In one implementation, the removable storage 616, which is a computer accessible medium, has a set of computer-executable instructions 630 stored thereon. When executed by the processing unit 602, the set of computer-executable instructions 630 cause the processing unit 602 to execute operations, tasks, functions and/or methods as described above, including processing flows 200, 300, 400 and/or 500 and any variations thereof.

Computing device 600 may also include one or more input devices 620 such as keyboard, mouse, pen, voice input device, touch input device, etc. Computing device 600 may additionally include one or more output devices 622 such as a display, speakers, printer, etc.

Computing device 600 may also include one or more communication connections 624 that allow the computing device 600 to communicate with apparatus 650 over network connection 628. Apparatus 650 may be a base station or a central office associated with the base station. In such case, computing device 600 may be a computing device used by an operator to control operations of the base station or a central office associated with the base station.

Upon executing the set of computer-executable instructions, whether stored in module 612 of program module 608 or in removable storage 616, processing unit 602 may direct computing device 600 or apparatus 650 to carry out a number of operations to implement the dynamic activation and release of the carrier aggregation technology in an LTE-Advanced system as described above, including processing flows 200, 300, 400 and/or 500 and any variations thereof.

It is appreciated that the illustrated computing device 600 is one example of a suitable device and is not intended to suggest any limitation as to the scope of use or functionality of the various embodiments described.

Additional And Alternative Implementation Notes

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Javan™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

We claim:

1. A method, comprising:
obtaining buffer status of a plurality of buffers of a plurality of component carrier schedulers, wherein each of the plurality of schedulers independently schedules respective resource blocks to transmit respectively distributed data packets utilizing a corresponding component carrier as part of carrier aggregation in a communication system; and distributing a flow of a plurality of data packets from a plurality of communication devices among the plurality of buffers of the plurality of component carrier schedulers according to the buffer status of the plurality of buffers, wherein the buffer status of each of the respective buffers indicates efficiency in distributing respective resource blocks of a respective one of the plurality of component carrier schedulers, and wherein the distributing is in accordance with the following formula:

$$Bi = R'_i + \left[1 - \frac{R'_i}{RB}\right] \times \Delta R$$

wherein:
Bi represents a flow distribution to be updated on an $i^{th}$ buffer of the plurality of buffers;
$R_i'$ represents an amount of a remaining flow of data packets on the $i^{th}$ buffer;
RB represents a depth of each of the plurality of buffers;
$\Delta R$ represents a basic unit of the distributed flow of data packets; and
$0 \leq \Delta R < RB$.

2. The method of claim 1, wherein the distributing comprises:
allocating a first number of data packets to a first buffer of the plurality of buffers and allocating a second number of data packets to a second buffer of the plurality of buffers in response to:
the first number being less than the second number, and
a respective buffer status of the first buffer and a respective buffer status of the second buffer indicating an amount of a remaining flow of data packets on the first buffer is greater than an amount of a remaining flow of data packets on the second buffer.

3. The method of claim 1, wherein at least one of the component carrier schedulers schedules the respective resource blocks of a respective component carrier according to a respective carrier quality index, a respective power, or a combination thereof.

4. The method of claim 1, further comprising:
obtaining an updated buffer status of the plurality of buffers at a later time; and
re-distributing the flow of the plurality of data packets from the plurality of communication devices among the plurality of buffers of the plurality of component carrier schedulers according to the updated buffer status of the plurality of buffers.

5. The method of claim 1, further comprising:
initializing a value of a respective buffer status of at least one of the plurality of buffers before the distributing.

6. An apparatus, comprising:
a memory in which a set of processor-executable instructions is stored; and
a processor coupled to the memory, upon executing the set of processor-executable instructions the processor performing operations comprising:
monitoring a buffer status of a plurality of buffers, each of the plurality of buffers corresponding to a respective one of a plurality of component carrier scheduler, wherein a respective buffer status of the each of the plurality of buffers indicates efficiency in distributing resource blocks of the respective one of a plurality of component carrier schedulers, wherein further each of the component carrier schedulers independently schedules respective resource blocks to transmit respectively distributed data packets utilizing a corresponding component carrier as part of carrier aggregation in a communication system, distributing a flow of a plurality of data packets from a plurality of communication devices among the plurality of buffers of the plurality of component carrier schedulers according to the buffer status of the plurality of buffers, and periodically adjusting the flow of the plurality of data packets distributed among the plurality of buffers in response to changes in the monitored buffer status of the plurality of buffers, wherein the distributing is in accordance with the following formula:

$$Bi = R'_i + \left[1 - \frac{R'_i}{RB}\right] \times \Delta R$$

wherein:
Bi represents a flow distribution to be updated on an $i^{th}$ buffer of the plurality of buffers;
$R_i'$ represents an amount of a remaining flow of data packets on the $i^{th}$ buffer;
$\Delta R$ represents a basic unit of the distributed flow of data packets; and
$0 \leq \Delta R < RB$.

7. The apparatus of claim 6, wherein the distributing comprises:
allocating a first number of data packets to a first buffer of the plurality of buffers and allocating a second number of data packets to a second buffer of the plurality of buffers in response to:
the first number being less than the second number, and a respective buffer status of the first buffer and respective buffer status of the second buffer indicating an amount of a remaining flow of data packets on the first buffer is greater than an amount of a remaining flow of data packets on the second buffer.

8. The apparatus of claim 6, wherein upon executing the set of processor-executable instructions the processor further performs operations comprising:
initializing a value of a respective buffer status of at least one of the plurality of buffers before the distributing.

9. A non-transitory computer-readable medium storing instructions that, when executed, cause one or more processors to perform operations comprising:
obtaining, at a first point in time, first buffer status of a plurality of buffers of a plurality of component carrier schedulers, wherein each of the plurality of schedulers independently schedules respective resource blocks to transmit respectively distributed data packets utilizing a corresponding component carrier as part of carrier aggregation in a communication system;
obtaining, at a second point in time after the first point in time, second buffer status of the plurality of buffers of the plurality of component carrier schedulers; and
adjusting a distribution of a flow of a plurality of data packets from a plurality of communication devices among the plurality of buffers of the plurality of component carrier schedulers in response to a difference between the first buffer status and the second buffer status of the plurality of buffers,
wherein the distribution of the flow of the plurality of data packets is in accordance with the following formula:

$$Bi = R'_i + \left[1 - \frac{R'_i}{RB}\right] \times \Delta R$$

wherein:
Bi represents a flow distribution to be updated on an $i^{th}$ buffer of the plurality of buffers;
$R_i'$ represents an amount of the remaining flow of data packets on the $i^{th}$ buffer;
RB represents a depth of each of the plurality of buffers;
ΔR represents a basic unit of the distributed flow of data packets; and
0≤ΔR<RB.

10. The computer-readable medium of claim 9, wherein the adjusting the distribution comprises:
allocating a first number of data packets to a first buffer of the plurality of buffers and allocating a second number of data packets to a second buffer of the plurality of buffers in response to:
the first number being less than the second number, and
a respective buffer status of the first buffer and a respective buffer status of the second buffer indicating an amount of a remaining flow of data packets on the first buffer is greater than an amount of a remaining flow of data packets on the second buffer.

11. The computer-readable medium of claim 9, wherein the operations further comprise:
initializing a value of a respective buffer status of at least one of the plurality of buffers before the distribution of the flow of the plurality of data packets.

* * * * *

UNITED STATES PATENT AND TRADEMARK OFFICE
CERTIFICATE OF CORRECTION

PATENT NO.      : 9,025,446 B2                                                          Page 1 of 1
APPLICATION NO. : 14/004371
DATED           : May 5, 2015
INVENTOR(S)     : Huang It is certified that error appears in the above-identified patent and that said Letters Patent is hereby corrected as shown below:

In the Specification

In Column 1, Line 7, delete "§371" and insert -- § 371 --, therefor.

In Column 14, Line 39, delete "Java™" and insert -- Java™ --, therefor.

In the Claims

In Column 16, Line 30, in Claim 11, delete "$i^{th}$ buffer; ΔR represents" and insert -- $i^{th}$ buffer; RB represents a depth of each of the plurality of buffers; ΔR represents --, therefor.

Signed and Sealed this
Seventeenth Day of November, 2015

Michelle K. Lee
*Director of the United States Patent and Trademark Office*